US010927814B2

(12) United States Patent
Spruce

(10) Patent No.: US 10,927,814 B2
(45) Date of Patent: Feb. 23, 2021

(54) CONTROL METHOD AND SYSTEM FOR PROTECTION OF WIND TURBINES

(71) Applicant: VESTAS WIND SYSTEMS A/S, Aarhus N (DK)

(72) Inventor: Chris Spruce, Leatherhead (GB)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 73 days.

(21) Appl. No.: 15/737,668

(22) PCT Filed: Jun. 23, 2016

(86) PCT No.: PCT/DK2016/050218
§ 371 (c)(1),
(2) Date: Dec. 18, 2017

(87) PCT Pub. No.: WO2017/000958
PCT Pub. Date: Jan. 5, 2017

(65) Prior Publication Data

US 2018/0156197 A1 Jun. 7, 2018

(30) Foreign Application Priority Data

Jun. 30, 2015 (DK) ................................ 2015 70414

(51) Int. Cl.
*F03D 9/00* (2016.01)
*H02P 9/04* (2006.01)
(Continued)

(52) U.S. Cl.
CPC ........... *F03D 7/0292* (2013.01); *F03D 7/028* (2013.01); *F03D 7/048* (2013.01);
(Continued)

(58) Field of Classification Search
CPC ......... F03D 7/028; F03D 7/0292; F03D 7/048
See application file for complete search history.

(56) References Cited

U.S. PATENT DOCUMENTS

2012/0029892 A1 2/2012 Thulke
2013/0257051 A1 10/2013 Spruce et al.
(Continued)

FOREIGN PATENT DOCUMENTS

CN 102072085 A 5/2011
CN 103237984 A 8/2013
(Continued)

OTHER PUBLICATIONS

Danish Patent and Trademark Office for Application No. PA 2015 70414 dated Feb. 9, 2016.
(Continued)

*Primary Examiner* — Tulsidas C Patel
*Assistant Examiner* — Thomas K Quigley
(74) *Attorney, Agent, or Firm* — Patterson + Sheridan, LLP

(57) ABSTRACT

A method is provided of controlling a wind turbine that is operating according to a control signal causing the wind turbine to be over-rated above the wind turbine's rated power. The method comprises: obtaining one or more signals, or values of variables, that indicate the fatigue lifetime of one or more of the wind turbine's components from turbine sensors; applying a lifetime usage estimator algorithm to the signals or values to determine measures of the fatigue life consumed by each of the turbine components; calculating, for each of the turbine components, a rate of consumption of fatigue life based on the measures of the fatigue life consumed by each of the turbine components; and controlling the turbine to reduce the amount of power by which the wind turbine is over-rated based on the rate of consumption of fatigue life for at least one of the turbine components.

22 Claims, 6 Drawing Sheets

(51) Int. Cl.
*F03D 7/02* (2006.01)
*F03D 7/04* (2006.01)

(52) U.S. Cl.
CPC . *F05B 2270/1033* (2013.01); *F05B 2270/332* (2013.01); *Y02E 10/72* (2013.01)

(56) References Cited

U.S. PATENT DOCUMENTS

| | | | |
|---|---|---|---|
| 2014/0248123 | A1 | 9/2014 | Turner et al. |
| 2014/0288855 | A1 | 9/2014 | Deshpande |

FOREIGN PATENT DOCUMENTS

| | | | | |
|---|---|---|---|---|
| CN | 103328818 | A | 9/2013 | |
| EP | 2096301 | A2 * | 9/2009 | ........... F03D 7/0284 |
| EP | 2757255 | A1 | 7/2014 | |
| WO | 2011150931 | A2 | 12/2011 | |
| WO | 2013044935 | A1 | 4/2013 | |
| WO | 2013075720 | A2 | 5/2013 | |
| WO | 2014149364 | A1 | 9/2014 | |
| WO | 2017000958 | A1 | 1/2017 | |

OTHER PUBLICATIONS

PCT Written Opinion of the International Searching Authority for Application No. PCT/DK2016/050218 dated Jun. 23, 2016.
PCT International Search Report for Application No. PCT/DK2016/050218 dated Jun. 23, 2016.
Chinese Office Action for Application No. 201680038723.8 dated Dec. 29, 2018.

* cited by examiner

CONTROL METHOD AND SYSTEM FOR PROTECTION OF WIND TURBINES

Embodiments of the present invention relate to a method and control system for use in protecting a wind turbine from severe operating conditions such as short term weather events.

FIG. 1A illustrates a large conventional wind turbine 1, as known in the art, comprising a tower 10 and a wind turbine nacelle 20 positioned on top of the tower 10. The wind turbine rotor 30 comprises three wind turbine blades 32 each having a length L. The wind turbine rotor 30 could comprise another number of blades 32, such as one, two, four, five, or more. The blades 32 are mounted on a hub 34 which is located at a height H above the base of the tower. The hub 34 is connected to the nacelle 20 through a low speed shaft (not shown) extending from the front of the nacelle 20. The low speed shaft drives a gearbox (not shown) which steps up the rotational speed and, in turn, drives an electrical generator within the nacelle 20 for converting the energy extracted from the wind by the rotating blades 32 into electrical power output. The wind turbine blades 32 define a swept area A, which is the area of a circle delineated by the rotating blades 32. The swept area dictates how much of a given air mass is intercepted by the wind turbine 1 and, thus, influences the power output of the wind turbine 1 and the forces and bending moments experienced by the components of the turbine 1 during operation. The turbine may stand onshore, as illustrated, or offshore. In the latter case the tower will be connected to a monopile, tripod, lattice or other foundation structure, and the foundation could be either fixed or floating.

Each wind turbine has a wind turbine controller, which may be located at the tower base or tower top, for example. The wind turbine controller processes inputs from sensors and other control systems and generates output signals for actuators such as pitch actuators, generator torque controller, generator contactors, switches for activating shaft brakes, yaw motors etc.

FIG. 1B shows, schematically, a conventional wind power plant 100 comprising a plurality of wind turbines 110, the controllers of each of which communicate with a power plant controller (PPC) 130. The PPC 130 can communicate bi-directionally with each turbine. The turbines output power to a grid connection point 140 as illustrated by the thick line 150. In operation, and assuming that wind conditions permit, each of the wind turbines 110 will output maximum active power up to their rated power as specified by the manufacturer.

FIG. 2 illustrates a conventional power curve 55 of a wind turbine plotting wind speed on the x axis against power output on the y axis. Curve 55 is the normal power curve for the wind turbine and defines the power output by the wind turbine generator as a function of wind speed. As is well known in the art, the wind turbine starts to generate power at a cut-in wind speed $V_{min}$. The turbine then operates under part load (also known as partial load) conditions until the rated wind speed is reached at point $V_R$. At the rated wind speed the rated (or nominal) generator power is reached and the turbine is operating under full load. The cut-in wind speed in a typical wind turbine may be 3 m/s and the rated wind speed may be 12 m/s, for example. Point $V_{max}$ is the cut-out wind speed which is the highest wind speed at which the wind turbine may be operated while delivering power. At wind speeds equal to, and above, the cut-out wind speed the wind turbine is shut down for safety reasons, in particular to reduce the loads acting on the wind turbine. Alternatively the power output may be ramped down as a function of windspeed to zero power.

The rated power of a wind turbine is defined in IEC 61400 as the maximum continuous electrical power output that a wind turbine is designed to achieve under normal operating and external conditions. Large commercial wind turbines are generally designed for a lifetime of 20 to 25 years and are designed to limit power output to the rated power level so that component loading is not excessive in high winds and the design loads and fatigue life of components are not exceeded.

Recently progress has been made in controlling turbines such that they can produce limited additional power above the rated power, under given operating conditions, as indicated by shaded area 58. The term "over-rating" is understood to mean producing more than the rated active power during full load operation by controlling one or more turbine parameters such as rotor speed, torque or generator current. An increase in speed demand, torque demand and/or generator current demand increases additional power produced by over-rating, whereas a decrease in speed, torque and/or generator current demand decreases additional power produced by over-rating. As will be understood, over-rating applies to active power, and not reactive power. When the turbine is over-rated, the turbine is run more aggressively than normal, and the generator has a power output which is higher than the rated power for a given wind speed. The over-rating power level may be up to 30% above the rated power output, for example. This allows for greater power extraction when this is advantageous to the operator, particularly when external conditions such as wind speed, turbulence and electricity prices would allow more profitable power generation.

Over-rating causes higher wear or fatigue on components of the wind turbine, which may result in early failure of one or more components and require shut down of the turbine for maintenance. As such, over-rating is characterised by a transient behaviour. When a turbine is over-rated it may be for as short as a few seconds, or for an extended period of time if the wind conditions and the fatigue life of the components are favourable to over-rating.

Wind turbines are commonly operated as part of a wind power plant comprising a plurality of wind turbines, as shown in FIG. 1B. U.S. Pat. No. 6,724,097 discloses operation of such a wind plant. The output of each turbine is determined and one or more turbines controlled so that the output power of one or more turbines is reduced if the total output exceeds the rated output of the plant. Such an arrangement is useful as the sum of the individual rated powers may exceed the rated output of the wind power plant, but at any one time not all turbines may be operating at full capacity; some may be shut down for maintenance and some may be experiencing less than ideal wind conditions. While the approach taken in U.S. Pat. No. 6,724,097 deals with avoiding overproduction by a wind power plant, the total output of the plant may not reach the rated plant power. It is sometimes desirable, therefore, to over-rate the output of one or more of the turbines to increase the total output of the power plant. However, such over-rating risks damaging the turbines, especially if the turbines are subsequently exposed to severe weather events whilst being over-rated.

Existing control techniques tend to focus on controlling wind turbines that are operating at or below a rated power. U.S. Pat. No. 6,850,821 discloses a wind turbine controller that uses measured stress conditions as an input allowing control of the output power as a function of measured stress.

Thus, for example, power output may be reduced in very turbulent wind conditions in comparison to less turbulent conditions having the same average wind speed. US-A-2006/0273595 discloses intermittently operating a wind power plant at an increased rated power output based on an assessment of operating parameters with respect to component design ratings and intermittently increasing the output power of a wind turbine based on the assessment. EP-1,911,968 describes a wind turbine control system in which a turbine is operated within rated power levels using feedback from a continuous-time damage model that calculates the rate at which damage is accumulated at any time.

The present invention aims to provide improved methods and apparatus for controlling wind turbines to provide additional protection against premature ageing and fatigue-damage accumulation when operating in an over-rated mode, and particularly to protect against fatigue damage caused by severe operating conditions.

SUMMARY OF THE INVENTION

The invention is defined in the independent claims to which reference is now directed. Preferred features are set out in the dependent claims.

Fatigue damage accumulation rates of components in wind turbines vary substantially under different operating conditions. For some mechanical components, operation in very high turbulence causes a rate of accumulation of fatigue damage that is many times higher than in normal turbulence. For some electrical components, operation at very high temperatures causes a rate of accumulation of fatigue damage (such as insulation breakdown rate) that is many times higher than at normal temperatures. As an example, a rule of thumb for generator windings is that a 10° C. decrease in winding temperature increases lifetime by 100%. Embodiments of the invention provide a method and controller that reduce, or even completely cancel, over-rating when a turbine is operating in particularly severe environmental conditions.

According to a first aspect of the invention there is provided a method of controlling a wind turbine that is operating according to a control signal causing the wind turbine to be over-rated above the wind turbine's rated power. The method comprises the steps of: obtaining one or more signals, or values of variables, that indicate the fatigue lifetime of one or more of the wind turbine's components from turbine sensors; applying respective lifetime usage estimator (LUE) algorithms to the signals or values to determine measures of the fatigue life consumed by each of the turbine components; calculating, for each of the turbine components, a rate of consumption of fatigue life based on the measures of the fatigue life consumed by each of the turbine components; and controlling the turbine to reduce the amount of power by which the wind turbine is over-rated based on the rate of consumption of fatigue life for at least one of the turbine components.

This method provides an override to account for higher fatigue loads on the turbine and generator caused by increased power generation. LUEs, especially for some mechanical and structural components, are used on a short term basis, on the order of minutes or seconds, for detecting rapid rates of change of fatigue indicating severe wind events. This can be usefully exploited to provide a protective control action which shuts down the turbine, or which does not go as far as a shutdown, e.g. a rapid entry into a "Safe Mode", such as a speed-de-rated mode, or a reduction in the over-rating applied, until the event has passed and the turbine can return to over-rating again. Such short-term use means that protection will be provided against, for example, a thunderstorm passing through a wind power plant, in which large changes in operating conditions take place at a given wind turbine over the time period of seconds or minutes.

In particular, embodiments may protect against low cycle fatigue (LCF), which is a mode of material degradation in which plastic strains are induced in a turbine or generator component due to the operating environment. LCF is characterised by high amplitude low frequency plastic strains. In wind turbines these large strains occur in areas of stress concentration and are compounded when the wind turbine is operating beyond its rated power generation level (i.e. during over-rating) and simultaneously experiences severe operating conditions caused by external conditions, such as an extreme weather event. LCF therefore refers to the small number of fatigue cycles that contribute a significant fraction of the lifetime fatigue damage of a component.

Use of LUEs to determine a rate of consumption of fatigue life allows turbine controllers to modify control of the wind turbine in response to the over-rating control signal, to reduce or cancel the amount of over-rating applied. This helps to ensure that ageing of turbine life is controlled while over-rating, and turbine rate of life use is maintained within the design envelope. The design envelope consists of the range of operating parameters within which the turbine is designed to operate (operational design envelope) or survive (survival design envelope). For example, the operational design envelope for the operating parameter gearbox oil temperature may be 10° C. to 65° C., that is, if the gearbox oil temperature moves outside this range then the turbine will be outside its operational design envelope. In this case, the turbine is protected by alarms (referred to in IEC 61400-1 as 'protection functions') and will shut down if the gearbox oil temperature moves outside this range. As well as being defined by real-time operating limits, such as temperatures and electrical current limitations, the operational design envelope may also, or alternatively, be defined by the loads, including fatigue loads, used to design the mechanical components and parts of the electrical components; i.e. the "design loads".

The LUEs are continuously or periodically monitored to provide on-line, real-time, inferential estimators of component life-use. The LUEs can therefore be used to periodically determine rate of consumption of fatigue life, allowing short-term control of a wind turbine against short term extreme events based on LUEs.

Calculating the rate of consumption of fatigue life optionally comprises, for each component: periodically sampling the fatigue life consumed by the turbine component; and determining the change in fatigue life consumed over a predetermined period of time comprising one or more of the sampling periods. The predetermined period of time, over which the change in fatigue life consumed is determined, may be selected to substantially avoid low cycle fatigue for the one or more turbine components. The predetermined period of time may preferably be less than one hour and greater than 0.5 seconds. More preferably the predetermined period of time is less than 15 minutes and more than 10 seconds. More preferably still the predetermined period of time may be around 10 minutes, or around 30 seconds.

The reduction of the amount by which the wind turbine is over-rated may be determined by applying a predetermined function that reduces the over-rating amount as a function of (e.g. in proportion to) the rate of consumption of fatigue life for each of the at least one turbine components. The predetermined function may specify a first value for the rate of consumption of fatigue life at which proportional control starts to reduce power demand, and a second value at which proportional control stops reducing power demand. The first and second values may be component dependent, the function therefore having different parameter values for each component being monitored.

The method optionally further comprises: calculating, for each of the turbine components, a component power demand value indicative of the amount of power by which over-rating is to be reduced based on the component rate of consumption of fatigue life; determining a turbine power demand value based on the minimum component power demand; and controlling the turbine to reduce the amount of power by which the wind turbine is over-rated based on the determined turbine power demand value. The method may optionally further comprise: comparing the turbine power demand value with a power demand value from an over-rating controller; selecting the lower power demand value; and controlling the turbine power according to the lower power demand value.

Alternatively, the method may optionally further comprise: calculating, for each of the turbine components, a component power demand value indicative of the amount of power by which over-rating is to be reduced based on the component rate of consumption of fatigue life; comparing the component power demands with a power demand value from an over-rating controller; selecting the lower power demand value; and controlling the turbine power according to the lower power demand value.

The component or turbine power demands may optionally be calculated as the fraction or percentage of over-rating that can be applied based on the component rate of consumption of fatigue life.

The rate of consumption of fatigue life may be normalised based upon a maximum value of the rate of consumption of fatigue life for that component, which may be obtained from a local or remote database or look-up table.

The turbine may be controlled, to reduce the amount by which the wind turbine is over-rated, by: reducing the power output of the turbine to the turbine's rated power; reducing the power output of the turbine to a de-rated value lower than the turbine's rated power; or shutting down the wind turbine. Further options include temporarily reducing the power output to zero and maintaining a grid connection; temporarily reducing the power output to zero and disconnecting from the grid; or disconnecting from the grid while maintaining a substantial rotational speed so that reconnection to the grid is faster.

The method may be employed within a wind turbine controller, within a power plant controller, or distributed between the two.

According to a second aspect of the invention there is provided a controller for a wind turbine, the controller comprising a lifetime usage estimator. The wind turbine controller is configured to: receive a control signal from an over-rating controller that causes the wind turbine to be over-rated above the wind turbine's rated power; and to adjust the amount by which the wind turbine is over-rated based on an input from the lifetime usage estimator. The lifetime usage estimator calculates a rate of consumption of fatigue life for each of one or more of a plurality of turbine components by calculating measures of the fatigue life consumed by each of the turbine components based on a lifetime usage algorithm for each component, the lifetime usage algorithms operating on one or more signals, or values of variables, that indicate the fatigue lifetime of the components, the signals or values being obtained from, or derived from, sensors on the wind turbine.

The over-rating controller may be part of the wind turbine controller, or it may be located separately.

A corresponding controller provided at the wind power plant level may also be provided.

According to a third aspect of the invention there is provided a computer program that when executed on a wind turbine controller causes it to carry out any of the methods described above or below.

The above method and control strategy may be employed to identify operation in unusually high turbulence conditions. Such high turbulence conditions may be caused by wind coming from a complex terrain direction, operation within a wake and/or operation in a thunderstorm. Over-rating can then be reduced, on a per-turbine basis, thereby reducing rate of accumulation of fatigue damage in mechanical components that are sensitive to turbulence and/or incur fatigue as function of power. The control strategy may alternatively, or in addition, identify operation at unusually high local temperatures in electrical components to also allow over-rating to be reduced, thereby reducing the rate of accumulation of fatigue (insulation) damage in electrical components for which fatigue is a function of power. For electrical components this applies particularly to those with short thermal time constants of less than approximately 1 h-3 h.

Due to the non-linear nature of the fatigue damage functions, the functionality implemented by embodiments of the invention, referred to as Severe Operation Avoidance (SOA), may optionally only be active for a maximum of 1% to 10% of the time, measured across a complete wind power plant for a full year. However, this small reduction in over-rating can provide a large (20 to 50%) reduction in additional fatigue damage on some components.

BRIEF DESCRIPTION OF THE DRAWINGS

The invention will now be further described by way of example only and with reference to the accompanying figures in which.

DETAILED DESCRIPTION OF PREFERRED EMBODIMENTS

According to embodiments of the invention, an over-rating control signal is generated by an over-rating controller and is used by a wind turbine controller to over-rate the turbine. The specific manner in which over-rating control signals are generated is not crucial to embodiments of the present invention, but an example will be given for ease of understanding.

Each wind turbine may include an over-rating controller, as part of the wind turbine controller. The over-rating controller calculates an over-rating request signal indicating an amount up to which the turbine is to over-rate the power output above rated output. The controller receives data from the turbine sensors, such as pitch angle, rotor speed, power output etc and can send commands, such as set points for pitch angle, rotor speed, power output etc. The controller may also receive commands from the grid, for example from the grid operator to boost or reduce active or reactive power output in response to demand or a fault on the grid.

Figure 3:
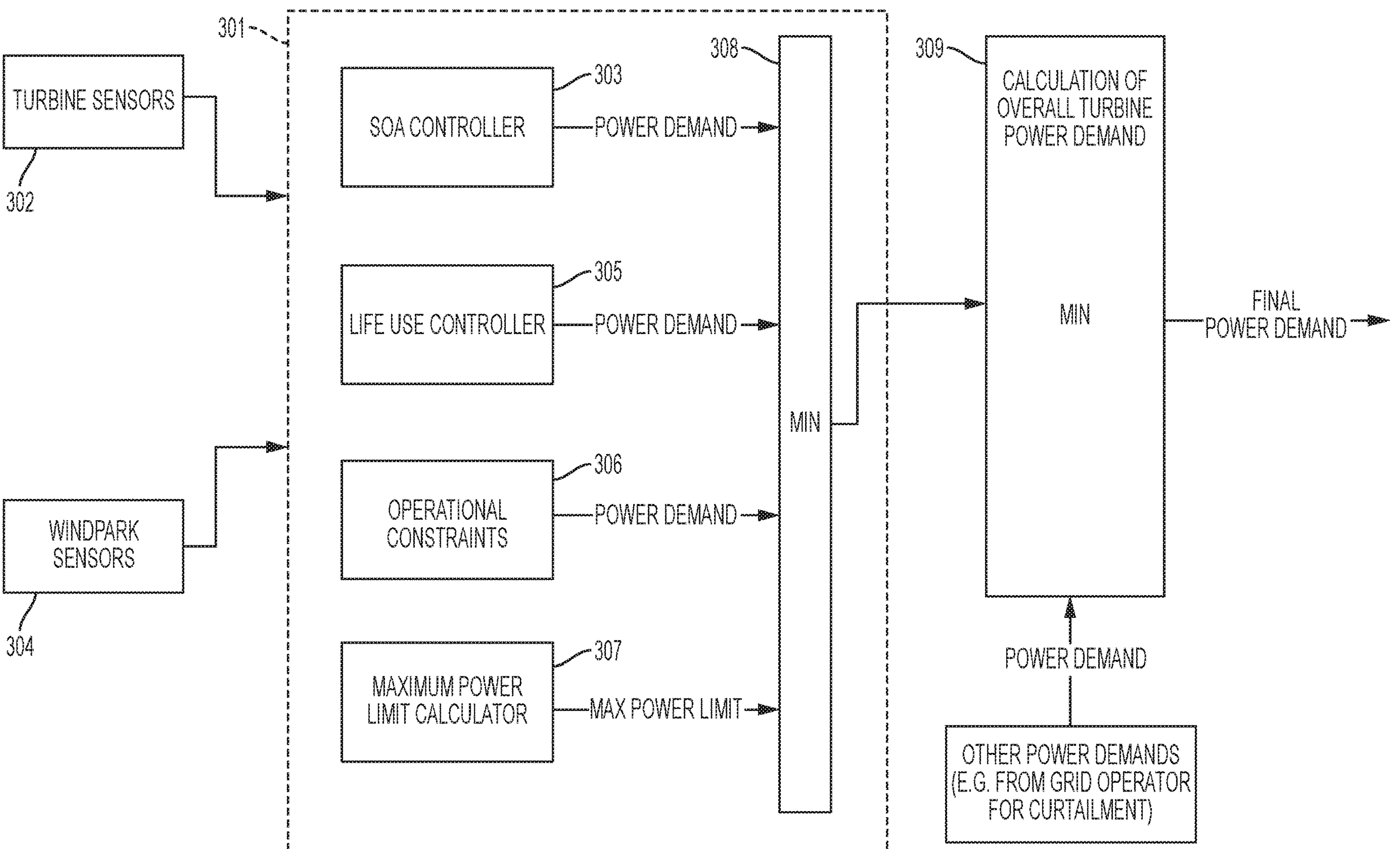
FIG. 3 is a schematic of a wind turbine controller arrangement.

FIG. 3 shows a schematic example of a turbine controller arrangement in which an over-rating controller 301 generates an over-rating control signal that can be used by wind turbine controllers to apply over-rating to the turbine. The over-rating control signal may be generated depending upon the output of one or more sensors 302/304 that detect operating parameters of the turbine and/or local conditions such as wind speed and direction. The over-rating controller 301 comprises one or more functional control modules that may be used in various aspects of over-rating control. Additional functional modules may be provided, the functions of modules may be combined and some modules may be omitted.

The life use controller (LUC) module 305 may use LUEs to control the lifetime of the associated components. This control function compares the current estimate of component life used with a target value for life use at the current time in the life of the turbine. The amount of over-rating applied to the wind turbine is then manipulated to limit the long-term rate of life use (RLU). The actuating signal for the LUC function at any time is the difference between the estimate of component life used and the target value for life use at that time.

Over-rating exploits the gap that typically exists between the component design-loads and the loads experienced by each turbine in operation, which are typically more benign than the IEC-standard simulated conditions for which the design loads were calculated. Over-rating causes the power demand for the turbine to be increased in high winds until either an operating limit specified by an operational constraint (temperature, etc.) is reached, or until an upper power limit is reached that has been set to prevent the exceedance of component design loads. Operational constraints, implemented by operational constraints control module 306, limit the possible over-rating power demand as a function of various operating parameters. For example, where a protection function is in place to initiate a shutdown when the gearbox oil temperature exceeds 65° C., an operational constraint may dictate a linear decrease in the maximum possible over-rating set point signal as a function of gearbox oil temperature for temperatures over 60° C., reaching "no over-rating possible" (i.e., a power set-point signal equal to the nominal rated power) at 65° C.

The upper or maximum power limit may be calculated by a maximum power limit calculation module 307. The maximum power level for a given turbine type is constrained by the ultimate or extreme load limits of the wind turbine mechanical components, and the design limits of the electrical components, since the maximum power cannot be safely increased beyond a level that would cause the turbine to experience mechanical load values or electrical loads higher than its ultimate design load limits. The maximum power level may be further refined for each individual turbine, being calculated based on the fatigue load values for each turbine, based on one or more of the conditions faced by each of the wind turbines at their specific location or position in the wind power plant, with individual maximum power levels being determined for each turbine in a given site. The individual maximum power level may be set so that the rate of consumption of fatigue life by the turbine, or by individual turbine components, gives a fatigue life that corresponds to, or exceeds, the particular target lifetime.

The power demands from the functional modules are provided to a minimum function, block 308, and the lowest power demand value is selected. A further minimum block 309 may be provided that selects the minimum power demand from the over-rating controller 301 and any other turbine power demands, such as those specified by a grid operator, to produce the final power demand applied by the wind turbine controller.

Figure 1A:
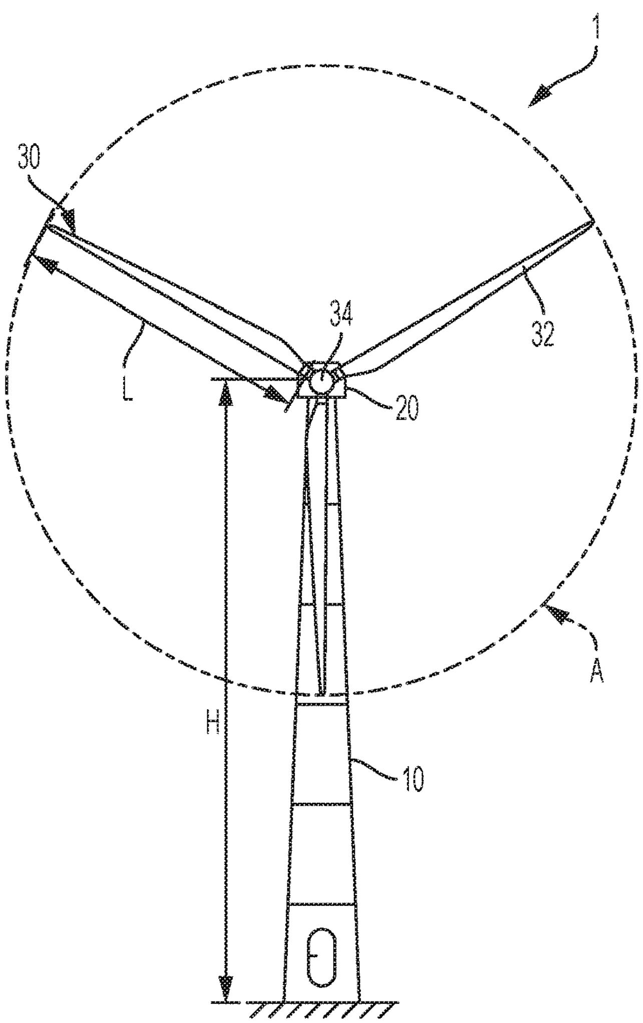
FIG. 1A is a schematic front view of a conventional wind turbine.
Figure 1B:
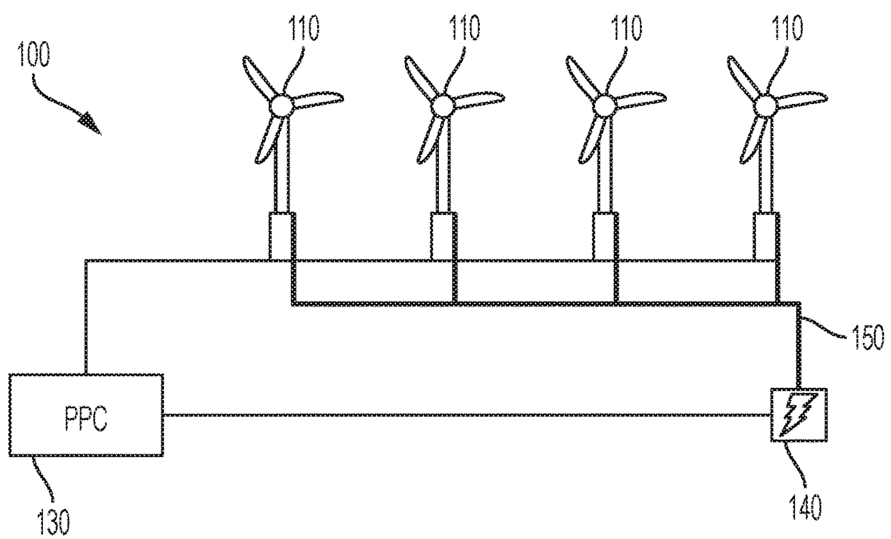
FIG. 1B is a schematic representation of a conventional wind power plant comprising a plurality of wind turbines.
Figure 2:
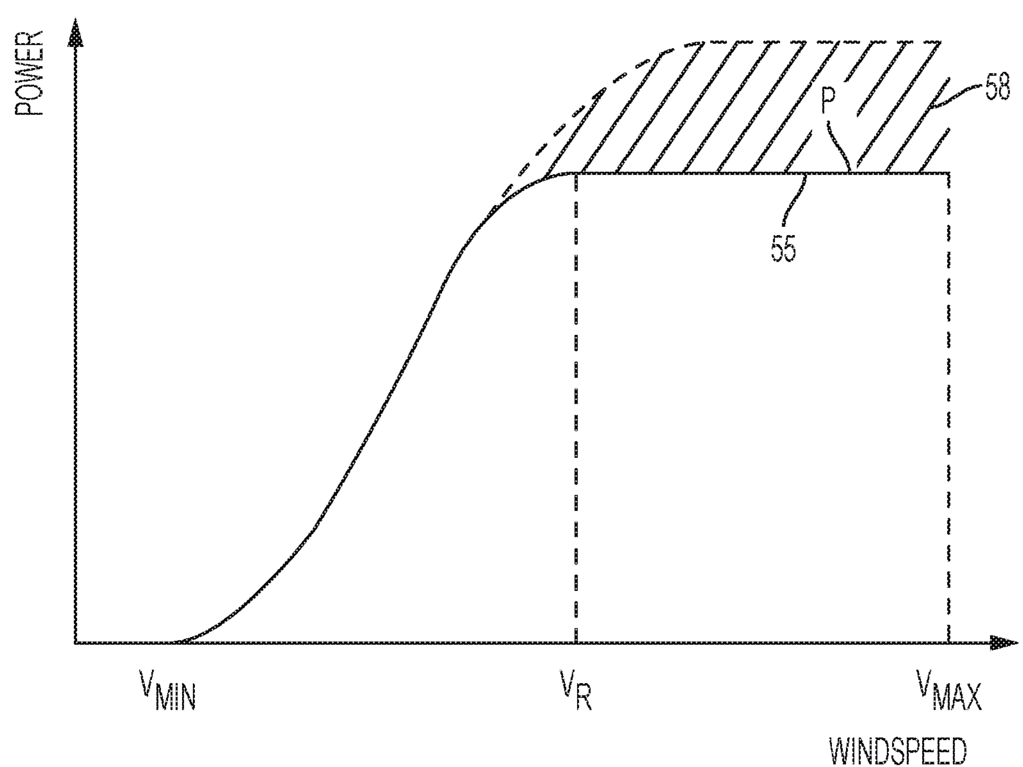
FIG. 2 is a graph of wind speed against power showing a power curve for a conventional wind turbine.

As an alternative, the over-rating controller may be part of the PPC controller 130 of FIG. 1B for example. The PPC controller communicates with each of the turbines and can receive data from the turbines, such as pitch angle, rotor speed, power output etc and can send commands to individual turbines, such as set points for pitch angle, rotor speed, power output etc. The PPC 130 also receives commands from the grid, for example from the grid operator to boost or reduce active or reactive power output in response to demand or a fault on the grid. Each wind turbine's controller communicates with the PPC 130.

The PPC controller 130 receives power output data from each of the turbines and is therefore aware of the active and reactive power output by each turbine and by the plant as a whole at the grid connection point 140. If required, the PPC controller 130 can receive an operating set point for the active power output of the power plant as a whole and divide this among each of the turbines so that the output does not exceed the operator assigned set point. This power plant set point may be anywhere from 0 up to the rated active power output for the plant. The "rated power" output for the plant is the sum of the rated active power output of the individual turbines in the plant. The power plant set point may be above the rated power output of the plant, i.e. the whole plant is over-rated.

The PPC may receive an input directly from the grid connection, or it may receive a signal which is a measure of the difference between the total power plant output and the nominal or rated power plant output. This difference can be used to provide the basis for over-rating by individual turbines. In theory, only a single turbine may be over-rated, but it is preferred to over-rate a plurality of the turbines, and most preferred to send the over-rating signal to all the turbines. The over-rating signal sent to each turbine may not be a fixed control, but may instead be an indication of a maximum amount of over-rating that each turbine may perform. Each turbine may have an associated controller, which may be implemented within the turbine controller or centrally such as at the PPC, which will determine whether the turbine can respond to the over-rating signal and, if so, by what amount. For example, where the controller within the turbine controller determines that conditions at a given turbine are favourable and above rated wind speed it may respond positively and the given turbine is over-rated. As the controllers implement the over-rating signal, the output of the power plant will rise.

An over-rating signal is therefore generated, either centrally or at each individual turbine, the signal being indicative of the amount of over-rating that may be performed by one or more turbines, or the turbines of the power plant as a whole.

According to a first embodiment, each turbine responds individually to over-rating signals in accordance with a Severe Operation Avoidance (SOA) controller 303 of the type shown in FIG. 3. The SOA controller generates a signal indicative of the amount of over-rating that can be applied, to reduce the amount of over-rating applied to the wind turbine. The signal is determined based upon inputs from one or more turbine sensors 302, which are used to determine real-time rate of lifetime usage for one or more turbine components. The rates of lifetime usage (RLUs) are used to determine the signal value, and thus to control the amount of over-rating applied to each turbine. Lifetime Usage Estimator (LUE) values are used to determine the RLU values.

Lifetime Usage Estimators may be used in ensuring the fatigue load limits of all turbine components remain within their design lifetimes. The loads a given component experiences (be they bending moments, temperatures, forces or motions for example) may be measured and the amount of component fatigue life consumed calculated, for example using a well known technique such as a rainflow count and Miner's rule or a chemical decay equation. Based on Lifetime Usage Estimators, individual turbines can then be operated in such a way as to not exceed their design limits. A device, module, software component or logical component for the measuring of the fatigue life consumed for a given turbine component may also be referred to as its Lifetime Usage Estimator, and the same acronym (LUE) will be used to refer to the algorithm for determining a lifetime usage estimate and the corresponding device, module or software or logic component.

The LUEs can be used in the turbine controller to determine whether the total fatigue experienced at a given point in time is below or above the level the turbine is designed to withstand, and the turbine controller can decide to overrate when the damage is below the expected level. In this specific type of application, which can be implemented by life use controller 305 for example, long-term corrections are applied over the course of weeks, months or years.

The LUEs can also be used to measure the rate of accumulation of fatigue, as opposed to an absolute level. If the fatigue lives of the components are being consumed quickly, the turbine controller can decide not to over-rate the turbine even if the current fatigue damage is less than expected at that time. The rate of usage of fatigue life may then be one input to the over-rating controller and may assist in the decision whether or not to overrate. Such uses of LUE values lend themselves to long term corrections that are applied over the course of weeks, months or years.

In contrast, embodiments of the invention use LUEs in a short-term protection mechanism, controlling wind turbines to protect against damage caused to components by short term extreme events by reducing the amount of additional power generated when over-rating is being applied. This is a protection mechanism rather than a mechanism to determine whether or not to over-rate.

SOA functionality for component rate of life-use is introduced for key electrical and mechanical components, to provide additional protection against premature ageing and fatigue-damage accumulation when the turbine is operating in particularly severe environmental conditions. Protected components may include one or more of: blades; pitch bearings; pitch actuators or drives; hub; main shaft; main bearing housing; main bearings; gearbox bearings; gear teeth, particularly for contact-point and/or bending stresses; generator, including windings, particularly with regards to thermal ageing; generator bearings; converter; generator terminal-box cable, particularly with regards to thermal ageing; yaw drives; yaw bearing; tower; offshore support structure if present; foundation, and transformer windings. RLUs may therefore be calculated for one or more of the following components:

blades;
pitch bearings;
pitch actuators or drives;
hub;
main shaft;
main bearing housing;
main bearings;
gearbox bearings;
gear teeth;
generator;
generator bearings;
converter;
generator terminal-box cable;
yaw drives;
yaw bearing;
tower;
offshore support structure if present;
foundation;
transformer windings.

Any suitable sensors may be used for calculating the life used for the above listed components, including temperature and electrical measurement sensors. One or more RLU values may be calculated for each of the components, since different Lifetime Usage Estimators may apply to a given component.

Figure 4:
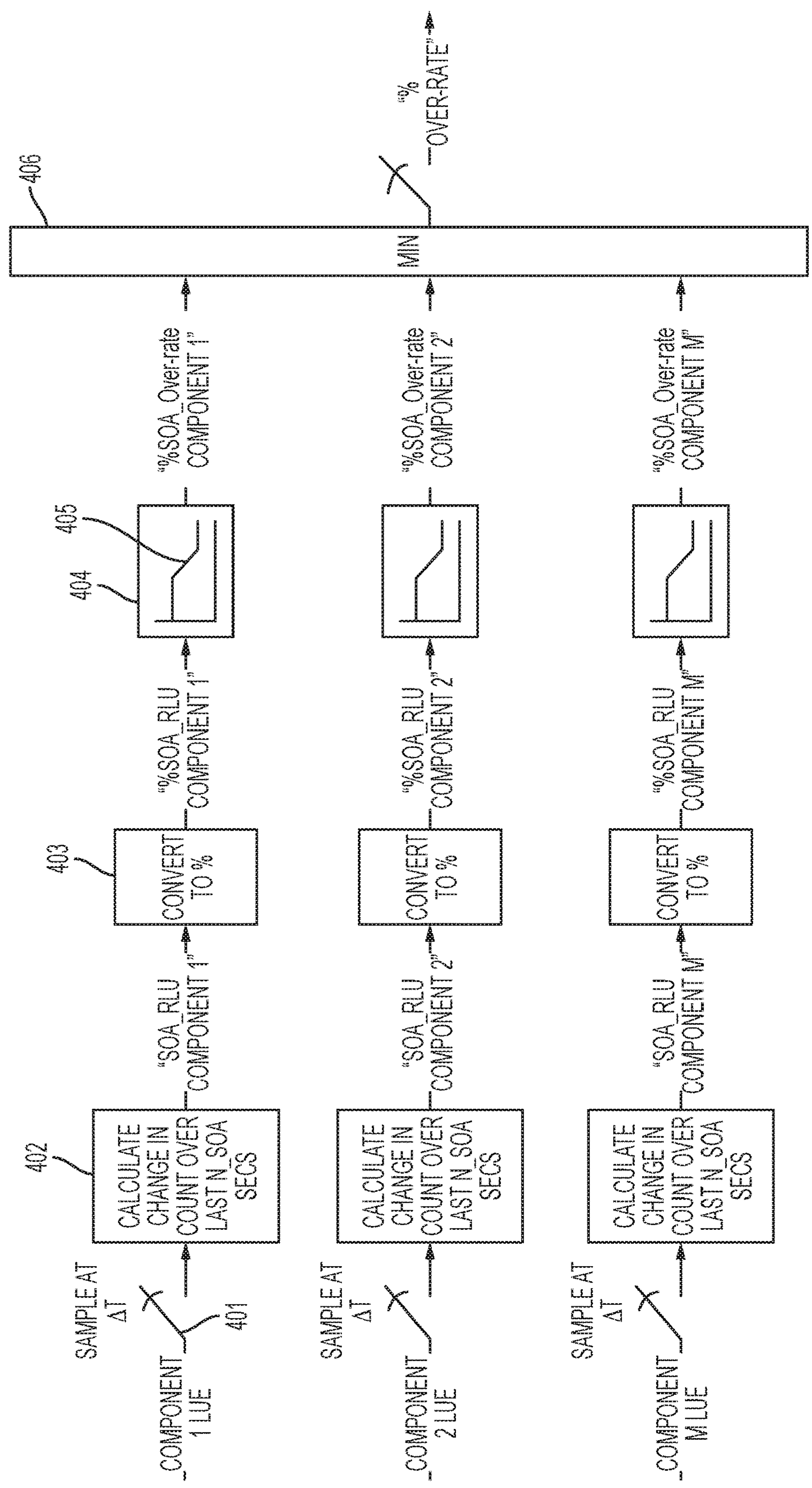
FIG. 4 is a schematic of the logical implementation of an SOA controller.

FIG. 4 shows an example schematic implementation of the logic involved in SOA control for a number, M, of components. The LUE for a given component is sampled by sampler 401 every $\Delta T$ seconds. Logic component 402 then determines the change in LUE since the last sample was obtained, thus providing a rate of change of Lifetime Usage Estimation, or RLU. The RLU is optionally converted to a percentage value, and possibly normalised, by logic component 403 to obtain a value for the RLU that is convenient to use and that can be compared with RLUs for other components. The RLU percentage value is then applied to a gain calculation logic component 404, which applies a gain function 405 to the value to determine a power demand or other appropriate value indicative of the amount of over-rating that can be applied.

The output of the SOA controller can be provided to a turbine power demand minimum function that takes all power demands being made of the turbine and identifies the minimum value. The SOA controller output is therefore compared against the output power demand from the rest of the over-rating controller and the SOA function will take precedence if its power demand is lower than that of the over-rating controller.

Figure 5:
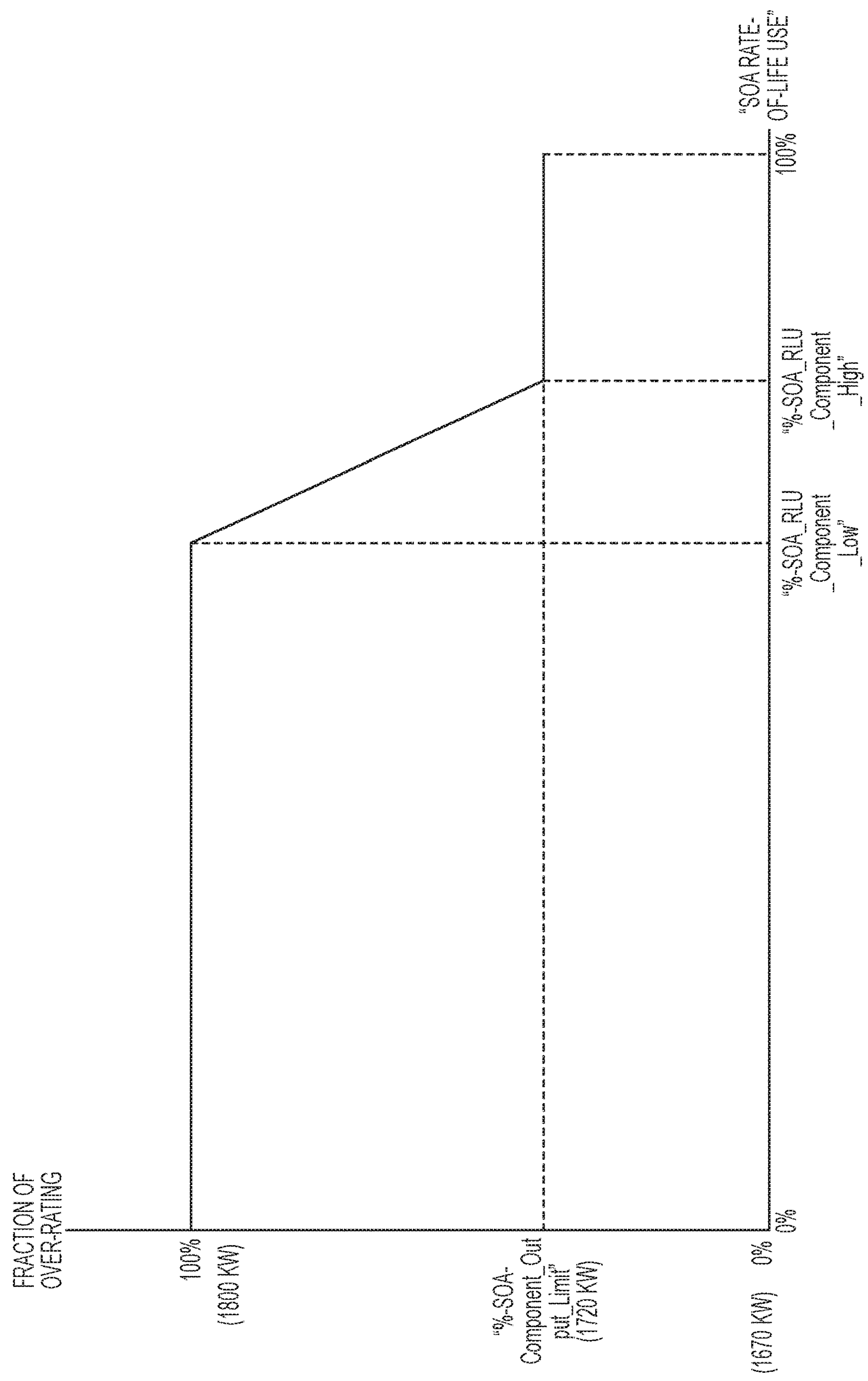
FIG. 5 is a representation of a gain function.

FIG. 5 shows an enlarged version of an example of the gain function 405 of FIG. 4, through which the percentage value of the rate of life use is passed. The gain function 405 is a curve that indicates permitted over-rating fractional values as a proportion of a nominal 100% over-rating signal against a value indicative of RLU for a given component. A first value, "% SOA_RLU_Component_Low", provides the value at which a proportional control action starts to reduce the power demand. A second value, "% SOA_RLU_Component_High", provides the value at which proportional control stops reducing power demand. The value "%-SOA-Component_Output_Limit" is the minimum level to which over-rating can be reduced. Each of these parameters may be modifiable by the operator. The shape of the proportional control part of the curve, for a given component, is therefore defined by the two pairs of co-ordinates as shown in FIG. 5:

(% SOA_RLU_Component_low, 100%)

(% SOA_RLU_Component_high, % SOA_Component_Output_Limit)

The upper output limit is preferably a constant and may be equal to 100%. The other three ordinates are parameters that vary depending upon the components in question. Example power levels are also shown for clarity, with a nominal power of 1670 kW and a maximum (100%) over-rating level of 1800 kW.

The value for "% SOA_RLU_Component_low" may, by default, be set to 80% and the value for "% SOA_RLU_Component_High" may, by default, be set to 90% for all components, but the individual low and high set points can be tailored for each component and may be adjusted by a user via a user interface. As the rate of life use measurement increases above the low set point value "% SOA_RLU_Component_low", the proportional control action reduces the "%-over-rate" until it reaches the minimum level set by "%-SOA-Component _Output_Limit", which is a parameter that can be changed by a user and may be set at 0%. Negative values for "%-SOA-Component_Output_Limit" may also be used to reduce the power rating of the turbine below rated power to protect components in the case of extreme RLU values.

As an alternative to using "%-SOA-Component_Output_Limit" within the function of FIG. 5, the allowable over-rating power "% Over-rate" may be passed through a further select function, a low select function, before being passed to a further low-select function that is common with any other over-rating control functions that may be implemented alongside the SOA functionality. The first low-select function compares the "%-over-rate signal(s)" with the minimum value "% SOA-Output-Limit", a parameter that can be set by the user via an interface and representing the maximum reduction in "%-over-rate", between 0-100%, that can be applied via SOA. The difference here is that "% SOA-Output-Limit" is applied to all components, while "%-SOA-Component_Output_Limit" provides individual lower limits for individual components.

The computation of the points on the proportional control portion of the function may be carried out in a computationally efficient way, by calculating the various parameters only at one or both of the following times:

(a) at initialisation of the power control on entry into a mode that permits over-rating; and/or (b) whenever a parameter change is detected from the user interface.

Using the response curve described above, the SOA controller identifies periods when RLU is particularly high on one or more components and provides an over-rate signal "% SOA_Over-rate_Component_M" for the Mth component indicative of the amount of over-rating that the component can perform in view of the RLU. The over-rate signal may, for example, represent a value in the form of a percentage that is less than 100%.

The above described processing is applied in parallel for each of the components being monitored. In order to provide an overall over-rating value the minimum value for "% SOA_over-rate_Component_M" is selected, representing the lowest permitted over-rating value for any of the components monitored. This is achieved by passing the over-rating values, "% SOA_over-rate_Component_M", obtained for each monitored component through a common "MIN" selection logic component 406 in FIG. 4, which selects the minimum value as the allowable over-rating power "% Over-rate". It will be appreciated that other methods for determining the amount of over-rating permitted based upon individual component RLUs may be used.

Embodiments of the invention aim to reduce substantially, or eliminate, the low cycle fatigue damage incurred due to over-rating. Low cycle fatigue damage is caused by the turbulent wind, rather than slower variations such as seasonal or day/night changes. Turbulent wind occurs with a frequency content of less than approximately one hour. The timescale between making respective determinations of RLU, and subsequently determining a value for the amount of over-rating that can be performed, is selected to be pertinent to turbulent wind. The time, "N_SOA secs", between successive updates of the over-rating amount, "% Over-rate", is therefore relatively short. This time period may be less than 1 hour and more than 0.5 seconds. Preferably the time period may be less than 15 minutes and more than 10 seconds. More preferably, the time period may be 30 seconds, or around 30 seconds. As described below, the time period may be defined in relation to the control time step of the over-rating controller.

The sampling time, $\Delta T$, between obtaining samples of the LUE for a given component is also relatively short. $\Delta T$ may preferably be between less than one minute and greater than or equal to 1 second. More preferably $\Delta T$ is 30 seconds, or approximately 30 seconds. The sampling time may be an integer fraction of the control time step used for the main over-rating controller.

The allowable over-rating power value based on RLUs described above may be used in conjunction with other control-function outputs, from other operational constraints and controls, to ultimately select a permissible over-rating value.

Figure 6:
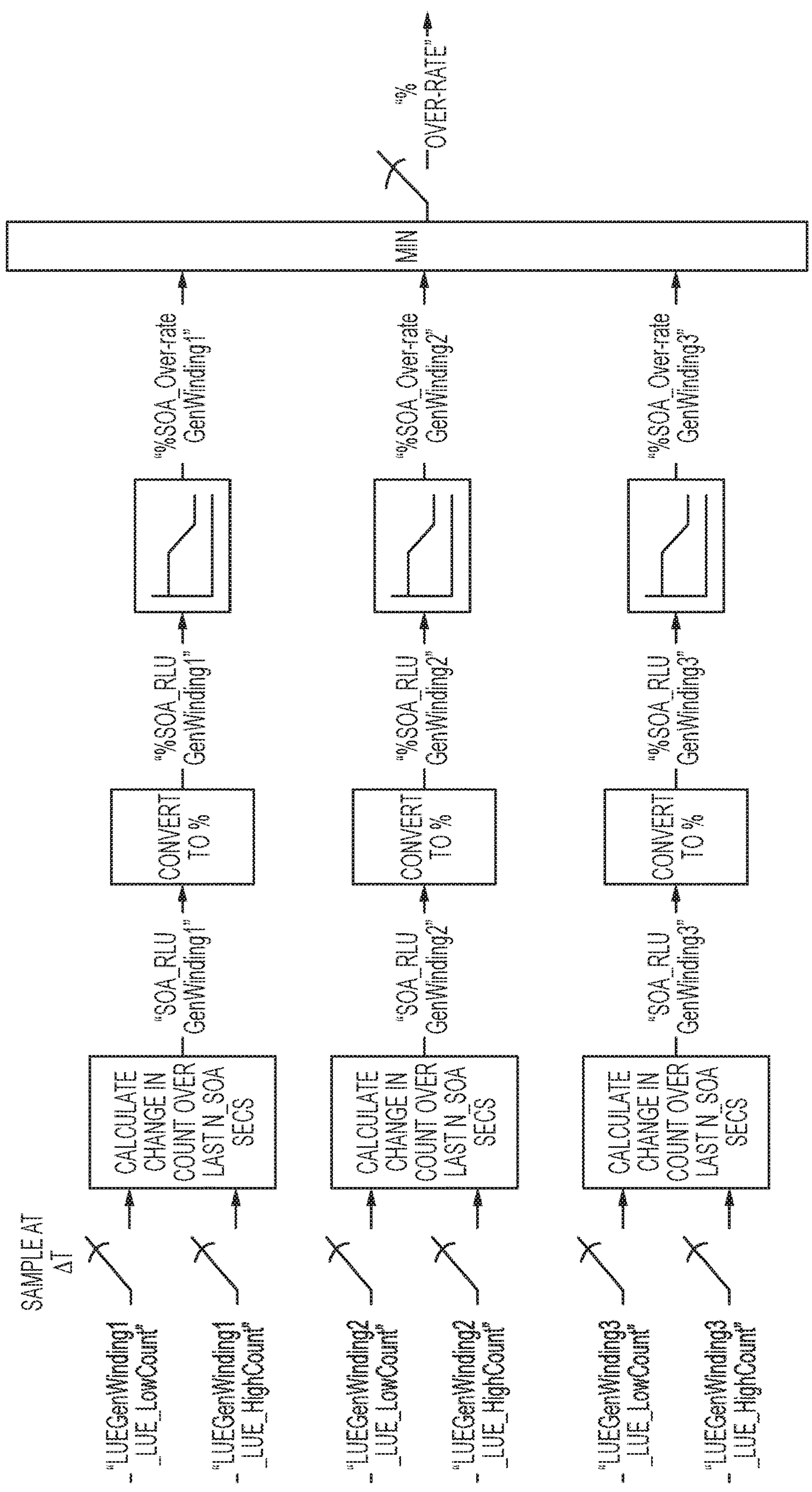
FIG. 6 is a specific example of the schematic of FIG. 4.

A particular example of the SOA functionality will be described in relation to FIG. 6. Shown in FIG. 6 are logic components of the sort shown in FIG. 4, used to calculate permissible over-rating gain values for any of the following components:

Generator stator winding #1
Generator stator winding #2
Generator stator winding #3
Generator terminal box cable
Transformer winding #1
Transformer winding #2
Transformer winding #3
Gearbox gear-tooth contact
Gearbox gear-tooth bending
Gearbox bearing #1
Gearbox bearing #2
Generator bearing (Drive End)
Generator bearing (Non-Drive End)
Main shaft
Tower
Blades
Pitch bearings;
Pitch actuators or drives;
Hub;
Main bearing housing;
Main bearings;
Converter;
Yaw drives;
Yaw bearing;
Offshore support structure if present;
Foundation;

FIG. 6 shows logic components for three of the turbine's generator stator windings. Similar logic components may be provided for other turbine components, such that the SOA is able to output a "%-overrate-signal" for each RLU calculated for each desired component. The method is applied within an overall over-rating control environment in which an over-rating controller is applying over-rating control at given time-step intervals. The SOA is used to modify the over-rating control.

The LUE values that are employed, e.g. "LUEGenWinding1", may consist of LowCount and HighCount values to give improved accuracy when calculating the rate of life used in the SOA calculation. The low count is incremented at a first resolution, which is preferably a fine granular resolution, and the high count is incremented at a second resolution that is lower than the first resolution. When the low count reaches a predetermined limit it is reset and the high count is incremented by one.

The SOA controller operates at every control time step of the over-rating controller, or at any integer multiple N_SOA of this time-step, whilst still observing the preferred "N_SOA secs" value ranges described above. The over-rating controller may have a time-step of several tens of seconds, and may be less than one minute. The time step may be from 15 to 45 seconds and may, for example, be 30 seconds. For an over-rating controller time step of 30 seconds the SOA controller may operate every 30 seconds, or every 60 seconds, or every 90 seconds, or every 120 seconds, and so on. A parameter "PARAM_N_SOA" provides the number of over-rating control time-steps that take place in between SOA time steps. The parameter may be modifiable at the operator console and may have a default value of 1.

For a given signal, e.g. generator stator winding #1, the value of RLU that is used in the SOA calculation will be the sum of the RLU values over the last "N_SOA" time steps. For example, if "N_SOA"=3 the SOA time-step is 90 seconds, and then the value of RLU used for the generator stator winding #1 is then the sum of RLUs over the previous three 30 second time-steps. The value of "SOA_RLU_Component" used for the generator stator winding #1 is then the difference between the current value of the low_count and the value of the low_count 90 seconds ago, added to the difference between the current value of the high_count and the value of the high_count 90 seconds ago.

In any embodiments, in order to calculate the RLU value for a given component, the lifetime usage estimation value for the component may be determined periodically, and the difference added up over the period "N_SOA secs" to provide the change in lifetime usage estimation value over that period. As described above, the lifetime usage estimation value may be determined using a sampling time $\Delta T$ that is smaller than the time "N_SOA secs", for example a 4 second sampling time may be used when "N_SOA sec" is 30 seconds.

The RLU value for a given component may be determined as a normalised value, normalised based upon the maximum known value of the RLU for that component obtained from a database or lookup table for a predetermined sampling period. Using the maximum value from a look-up table ensures that the RLU value can, for example, be expressed as a percentage no greater than 100%. For example, for each RLU, the normalisation could use the maximum RLU value that could be achieved from the lookup table in the sample time available. As a particular example, in the "Convert to %" block in FIG. 6, SOA_RLU_Component is divided by the maximum change in "SOA_RLU_Component" that, from simulation or otherwise, is ever expected to occur over time $\Delta T$, to ensure that the value for "% SOA_RLU_Component" never exceeds 100%.

The control methods described herein may be implemented directly in a turbine controller. Alternatively, the methods may be implemented in a local site controller, such as a wind power plant controller, where the control function and associated over-ride are applied, individually, to a plurality of wind turbines and the output power demand of the control function is then applied to the individual turbine controllers. Alternatively the methods may be implemented remotely in a similar manner. The methods may, in some embodiments, be implemented as part of an over-rating controller, which controls the amount of power generated above rated power by over-rating the turbine. In other embodiments the controller may be used to control de-rating of a turbine, reducing power below rated power using input from LUEs.

The controllers and logic elements described herein may be implemented as hardware components or software executing on one or more processors located at the wind turbines, the PPC or a remote location, or a combination thereof.

It should be noted that embodiments of the invention may be applied to both constant-speed and variable-speed turbines. The turbine may employ active pitch control, whereby power limitation above rated wind speed is achieved by feathering, which involves rotating all or part of each blade to reduce the angle of attack. Alternatively, the turbine may employ active stall control, which achieves power limitation above rated wind speed by pitching the blades into stall, in the opposite direction of that used in active pitch control.

Lifetime Usage Estimators

The lifetime usage estimators will now be described in more detail. The algorithm required to estimate lifetime usage will vary from component to component and the LUEs may comprise a library of LUE algorithms including some or all of the following: load duration, load revolution distribution, rainflow counting, stress cycle damage, temperature cycle damage, generator thermal reaction rate, transformer thermal reaction rate and bearing wear. Additionally other algorithms may be used. As mentioned above, lifetime usage estimation may only be used for selected key components and the use of a library of algorithms enables a new component to be selected for LUE and the suitable algorithm selected from the library and specific parameters set for that component part.

In one embodiment, LUEs are implemented for all major components of the turbine described herein, including the blade structure, the blade bearings and bolts, the blade pitch system, the main shaft and bearing system, the gearbox (including gear-tooth contact point, gearbox gear-tooth root bending and/or gearbox bearings), the generator (including windings, bearings and/or terminal box cable), the converter, the transformer (including transformer windings), the yaw system, the tower and the foundation. Alternatively a selection of one or more of the LUEs may be made.

As examples of the appropriate algorithms, rainflow counting may be used in the blade structure, blade bolts, pitch system, main shaft system, converter, yaw system, tower and foundation estimators. In the blade structure algorithm, the rainflow count is applied to the blade root bending flapwise and edgewise moment to identify the stress cycle range and mean values and the output is sent to the stress cycle damage algorithm. For the blade bolts, the rainflow count is applied to the bolt bending moment to identify stress cycle range and mean values and the output sent to the stress cycle damage algorithm. In the pitch system, main shaft system, tower and foundation estimators the rainflow counting algorithm is also applied to identify the stress cycle range and mean values and the output sent to the stress cycle damage algorithm. The parameters to which the rainflow algorithm is applied may include:

Pitch system—pitch force;

Main shaft system—main shaft torque;

Tower—tower stress;

Foundation—foundation stress.

In the yaw system the rainflow algorithm is applied to the tower top torsion to identify the load duration and this output is sent to the stress cycle damage algorithm. In the converter, generator power and RPM is used to infer the temperature and rainflow counting is used on this temperature to identify the temperature cycle and mean values.

Lifetime usage in the blade bearings may be monitored either by inputting blade flapwise load and pitch velocity as inputs to the load duration algorithm or to a bearing wear algorithm. For the gearbox, the load revolution duration is applied to the main shaft torque to calculate the lifetime used. For the generator, generator RPM is used to infer generator temperature which is used as an input to the thermal reaction rate generator algorithm. For the transformer, the transformer temperature is inferred from the power and ambient temperature to provide an input to the transformer thermal reaction rate algorithm.

Where possible it is preferred to use existing sensors to provide the inputs on which the algorithms operate. Thus, for example, it is common for wind turbines to measure directly the blade root bending edgewise and flapwise moment required for the blade structure, blade bearing and blade bolts estimators. For the pitch system, the pressure in a first chamber of the cylinder may be measured and the pressure in a second chamber inferred, enabling pitch force to be calculated. These are examples only and other parameters required as inputs may be measured directly or inferred from other available sensor outputs. For some parameters, it may be advantageous to use additional sensors if a value cannot be inferred with sufficient accuracy.

The algorithms used for the various types of fatigue estimation are known and may be found in the following standards and texts:

Load Revolution Distribution and Load Duration:

Guidelines for the Certification of Wind Turbines, Germainischer Lloyd, Section 7.4.3.2 Fatigue Loads Rainflow:

IEC 61400-1 'Wind turbines—Part 1: Design requirements, Annex G

Miners Summation:

IEC 61400-1 'Wind turbines—Part 1: Design requirements, Annex G

Power Law (Chemical decay):

IEC 60076-12 'Power Transformers—Part 12: Loading guide for dry-type power transformers', Section 5.

The invention claimed is:

1. A method of controlling a wind turbine that is operating according to a control signal causing the wind turbine to be over-rated above a rated power of the wind turbine, the method comprising:

obtaining, from one or more turbine sensors, one or more signals that indicate a fatigue life of one or more turbine components of the wind turbine;

applying one or more lifetime usage estimator algorithms to the one or more signals, or to values of variables, to determine measures of the fatigue life consumed by each of the one or more turbine components;

determining to operate the wind turbine above the rated power of the of the wind turbine for a first time period based on the measures of the fatigue life consumed by each of the one or more turbine components;

calculating, for each of the one or more turbine components, a respective short-term rate of consumption of the fatigue life based on the measures of the fatigue life consumed by each of the one or more turbine components during the first time period the wind turbine is operating above the rated power of the wind turbine;

determining the respective short-term rate of consumption is above a threshold for change to the fatigue life during the time period the wind turbine is operating above the rated power of the wind turbine; and controlling the wind turbine, for a short-term time period during the first time period the turbine is operating above the rated power of the wind turbine, to reduce an amount of power by which the wind turbine is over-rated based on the respective short-term rate of consumption of the fatigue life for at least one of the one or more turbine components.

2. The method according to claim 1, wherein calculating the respective rate of consumption of the fatigue life comprises, for each turbine component of the one or more turbine components:

during a plurality of sampling periods, sampling the fatigue life consumed by the turbine component; and determining a change in the fatigue life consumed over a predetermined period of time comprising one or more of the plurality of sampling periods.

3. The method according to claim 2, wherein the predetermined period of time is selected to substantially avoid low cycle fatigue for the one or more turbine components.

4. The method according to claim 2, wherein the predetermined period of time is less than one hour and greater than 0.5 seconds.

5. The method according to claim 4, wherein the predetermined period of time is less than 15 minutes and more than 10 seconds.

6. The method according to claim 5, wherein the predetermined period of time is around 30 seconds.

7. The method according to claim 5, wherein the predetermined period of time is around 10 minutes.

8. The method according to claim 1, wherein the reduction of the amount of power by which the wind turbine is over-rated is determined by applying a predetermined function that reduces an over-rating amount in proportion to the respective rate of consumption of the fatigue life for each of the one or more turbine components.

9. The method according to claim 8, wherein the predetermined function specifies:

a first value for the rate of consumption of the fatigue life at which proportional control starts to reduce power demand, and a second value at which the proportional control stops reducing power demand.

10. The method according to claim 9, wherein the first value and the second value are component dependent.

11. The method according to claim 1, further comprising:

calculating, for each of the one or more turbine components, a component power demand value indicative of the amount of power by which over-rating is to be reduced based on the respective rate of consumption of the fatigue life; and determining a turbine power demand value based on a minimum of the component power demand values for the one or more turbine components, wherein controlling the wind turbine to reduce the amount of power by which the wind turbine is over-rated is based on the determined turbine power demand value.

12. The method according to claim 11, further comprising:

comparing the turbine power demand value with a power demand value from an over-rating controller; and selecting a lesser power demand value of the turbine power demand value and the power demand value from the over-rating controller; and controlling power of the wind turbine according to the lesser power demand value.

13. The method according to claim 1, further comprising:

calculating, for each of the one or more turbine components, a respective power demand value indicative of the amount of power by which over-rating is to be reduced based on the respective rate of consumption of the fatigue life;

comparing the respective power demand values of the one or more turbine components with a power demand value from an over-rating controller;

selecting a lesser power demand value of the respective power demand values and the power demand value from the over-rating controller; and controlling power of the wind turbine according to the lesser power demand value.

14. The method according to claim 11, wherein at least one of the component power demand value and the turbine power demand value are calculated as a fraction or percentage of over-rating that can be applied based on the respective rate of consumption of the fatigue life.

15. The method according to claim 2, further comprising, for each turbine component:

normalizing the respective rate of consumption of the fatigue life based upon a maximum value of the respective rate of consumption of the fatigue life for the turbine component.

16. The method according to claim 1, wherein controlling the wind turbine to reduce the amount of power by which the wind turbine is over-rated comprises:

reducing a power output of the wind turbine to the rated power.

17. The method according to claim 1, wherein controlling the wind turbine to reduce the amount of power by which the wind turbine is over-rated comprises:

reducing a power output of the wind turbine to a de-rated value less than the rated power.

18. The method according to claim 1, wherein controlling the wind turbine to reduce the amount of power by which the wind turbine is over-rated comprises performing at intervals one of the following:

shutting down the wind turbine;

temporarily reducing a power output of the wind turbine to zero and maintaining a connection of the wind turbine with a grid;

temporarily reducing the power output to zero and disconnecting the wind turbine from the grid; and disconnecting the wind turbine from the grid while maintaining a substantial rotational speed.

19. The method according to claim 1, wherein the amount of power by which the wind turbine is over-rated is selected to substantially avoid low cycle fatigue to the one or more turbine components.

20. The method according to claim 1, wherein the one or more turbine components comprise one or both of mechanical components and electrical components of the wind turbine.

21. A controller for a wind turbine, the controller comprising:

one or more computer processors configured to:

implement a lifetime usage estimator that calculates a respective short-term rate of consumption of fatigue life for each turbine component of one or more turbine components of the wind turbine, during a time period the wind turbine is operating above a rated power of the wind turbine, wherein calculating the respective rate of consumption of the fatigue life is based on a lifetime usage algorithm for the respective turbine component, wherein the lifetime usage algorithm operates on one or more signals, or on values of variables, that indicate the fatigue life of the one or more components, wherein the one or more signals or the values are obtained from, or derived from, one or more turbine sensors during the time period the wind turbine is operating above the rated power of the wind turbine;

receive a control signal from an over-rating controller that causes the wind turbine to be over-rated above a rated power of the wind turbine for a first time period;

determine the respective short-term rate of consumption is above a threshold for change to the fatigue life during the first time period the wind turbine is operating above the rated power of the wind turbine; and adjust an amount by which the wind turbine is over-rated for a short-term time period during the first time period the turbine is operating above the rated power of the wind turbine based on an input from the lifetime usage estimator.

22. A controller for a wind power plant, the controller comprising:

one or more computer processors configured to, for each of a plurality of wind turbines of the wind power plant:

implement a lifetime usage estimator that calculates a respective short-term rate of consumption of fatigue life for each turbine component of one or more turbine components of the wind turbine during a time period the wind turbine is operating above a rated power of the wind turbine, wherein calculating the respective rate of consumption of the fatigue life is based on a lifetime usage algorithm for the respective turbine component, wherein the lifetime usage algorithm operates on one or more signals, or on values of variables, that indicate the fatigue life of the one or more components, wherein the one or more signals or the values are obtained from, or derived from, one or more turbine sensors during the time period the wind turbine is operating above the rated power of the wind turbine;

receive a control signal from an over-rating controller that causes the wind turbine to be over-rated above a rated power of the wind turbine for a first time period;

determine the respective short-term rate of consumption is above a threshold for change to the fatigue life during the first time period the wind turbine is operating above the rated power of the wind turbine; and adjust an amount by which the wind turbine is over-rated for a short-term time period during the first time period the turbine is operating above the rated power of the wind turbine based on an input from the lifetime usage estimator.

* * * * *